United States Patent [19]

Olds et al.

[11] 4,236,488
[45] Dec. 2, 1980

[54] SEPARABLE MULTI-COMPONENT AQUARIUM FILTERING AND CLEANING DEVICE

[75] Inventors: Linda W. Olds; Merton R. Olds, both of 14 Weldin Park La., Weldon Park, Wilmington, Del. 19803

[73] Assignees: Linda W. Olds; Merton R. Olds, both of Wilmington, Del.; John L. Williamson, Boling Brook, Ill.

[21] Appl. No.: 935,905

[22] Filed: Aug. 23, 1978

[51] Int. Cl.³ .................................... A01K 64/00
[52] U.S. Cl. .............................. 119/5; 15/246.5
[58] Field of Search ......................... 119/5; 15/246.5

[56] References Cited

U.S. PATENT DOCUMENTS

| | | | |
|---|---|---|---|
| 460,809 | 10/1891 | Gunther | 119/5 |
| 1,333,454 | 3/1920 | Sato | 119/5 |
| 3,208,090 | 9/1965 | Roesel, Jr. | 119/5 X |
| 3,265,388 | 8/1966 | Kane | 119/5 X |
| 3,316,882 | 5/1967 | Renwick | 119/5 |
| 3,924,570 | 12/1975 | Lamonica | 119/5 |

*Primary Examiner*—Hugh R. Chamblee
*Attorney, Agent, or Firm*—Connolly and Hutz

[57] ABSTRACT

This invention relates to an internal multi-component accessory for tall aquariums (those whose depth makes the aquatic life inaccessible and cleaning of the inside walls of the aquarium impractical by normal means). The objective of this accessory is to filter the water, clean the inside walls of the aquarium, provide heat and light, while providing for the transfer of air into the aquarium. It is a further objective of this accessory to provide convenient access to all fish and plant life within the aquarium by floating from its position on the bottom of the aquarium to the top bringing up all fish and plant life as well as gravel (filtration medium). The accessory is a plastic container abutted to a sponge between two rigid plastic plates, both of which are designed to conform to the inside of the aquarium. The container holds gravel in its top outer shell while providing a bottom inner core or pocket for trapping air. The sponge with its two plastic plates has a heating and lighting unit in its center.

5 Claims, 3 Drawing Figures

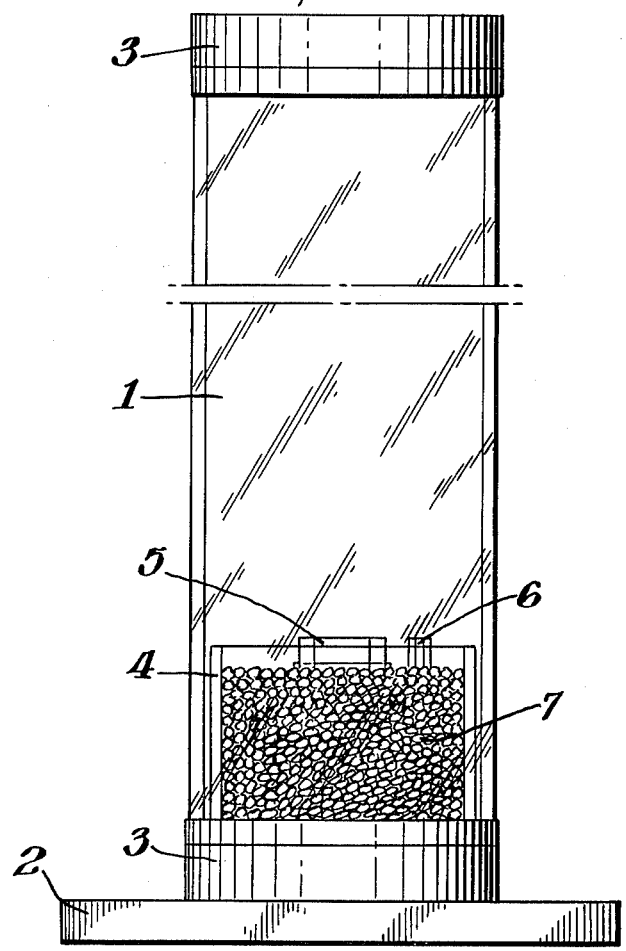
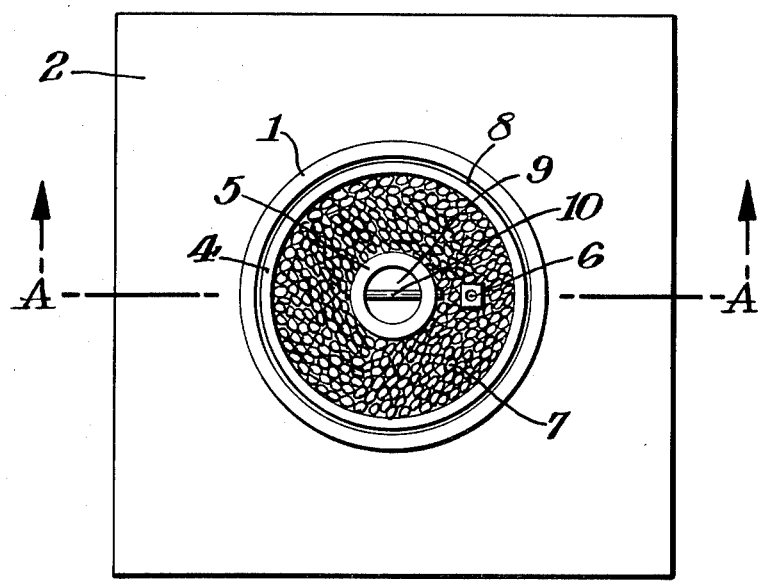

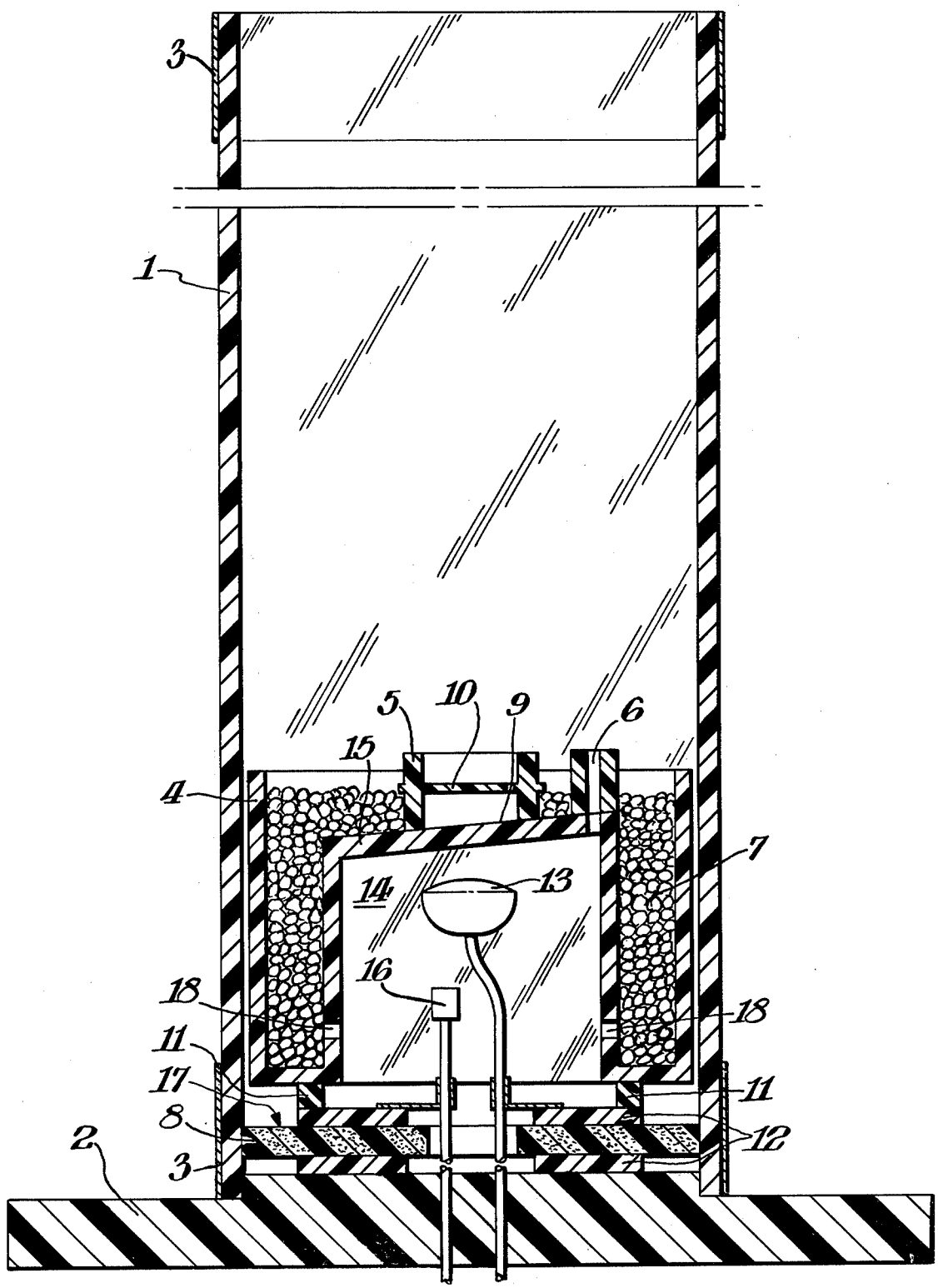

4,236,488

SEPARABLE MULTI-COMPONENT AQUARIUM FILTERING AND CLEANING DEVICE

BACKGROUND AND OBJECTS OF THE INVENTION

An aquarium as an aquatic life exhibit apparatus has long been popular in homes and offices by reason of the wide variation of aquatic life that is possible to be displayed therein. Recently modern designs have introduced new plastic aquariums of intriguing shapes and configurations. Unfortunately, these novel designs have used established methods of construction, lighting, heating, and filtration. Consequently no thought has been given to the accessibility to the bottom of the aquarium. For example, once fish and plants are introduced into a tall (greater than an arm's length in depth) aquarium, for all practical purposes they are not accessible until the water is drained or poured out. A dead fish can be removed from the bottom only with great difficulty. Further, aesthetic arrangement of the elements on the bottom of the aquarium is equally difficult.

In tall aquariums no thought has been given to cleaning algae from aquarium walls. When these aquariums need cleaning, the solid contents must be poured out of the top of the aquarium. This is cumbersome and can damage the viewing area and cause harm to fish and plant life.

We have invented an internal accessory which eliminates these problems.

An object of this present invention is to provide a free-standing filtration system which conforms to the shape of the aquarium, serves as the bottom of the aquarium, and can be easily made to float to the top.

Another object of this present invention is to provide a complementary filtration unit which contains the heating and lighting device and can be easily removed and replaced and also cleans the walls of the aquarium while being easily removed and replaced.

Another object of this invention is to provide containerized filtration, heating, lighting and aesthetics for easy manipulation and maintenance.

In accordance with these and other objects, there is provided by the present invention a structure for containing gravel (filtration medium) which structure contains a pocket that collects and channels air from the aquarium base through the aeration/filtration exit, causing the aquarium water to circulate through the gravel and a sponge. When the aeration/filtration exit is plugged the pocket fills with air, thus causing the container to float. This container is made of acrylic or other clear plastic to display the gravel and other aesthetic ornaments while remaining almost invisible in the water.

The complementary filtration unit is a sponge sandwiched between two rigid plastic sheets which acts as a level (flat) foundation on which the floating structure sits and provides a tight semipermeable seal against the aquarium walls, thus trapping particulate matter which circumvents the gravel filter. The complementary unit contains the lighting and heating elements and scrubs algae from the aquarium walls when it is removed and replaced.

BRIEF DESCRIPTION OF DRAWINGS

Novel features and advantages of the present invention will become apparent to those skilled in the art from a reading of the following detailed description in conjunction with the accompanying drawings wherein:

FIG. 1 is a front elevation view of a 6 foot aquarium showing the gravel in the floatable filtration unit as it rests in its normal position at the bottom of the aquarium;

FIG. 2 is a top elevation view of the aquarium as in FIG. 1; and

FIG. 3 is an enlarged vertical sectional view taken along line AA of FIG. 2.

DETAILED DESCRIPTION OF INVENTION

This invention is a means for greatly enhancing the pleasure derived from fish and other aquatic life. This apparatus offers advantages heretofore unavailable in tall aquariums, in that it provides a compact unit for filtration, aeration, heating and lighting, as well as easy cleaning of the inside walls of the aquarium. In addition, this unit is unique in that it provides a convenient access to fish and plant life by having a portion thereof that floats to the top of the aquarium. The invention is best understood by reference to the various figures of the drawings wherein like parts are designated with like numerals throughout.

Referring to FIG. 1, a typical tall aquarium is represented by a container having a tall transparent cylindrical tube or side wall (1) attached to a base or bottom wall (2) with opaque decorative trim (3). At the bottom of the tube (1) is the floatable filtration unit (4) containing gravel (7). Portions of the floatable filtration unit (4) are hidden by the decorative trim (3) and gravel (7) but the entire unit is visible in FIG. 3 and will be described later.

FIG. 2 shows that the floatable filtration unit (4) conforms to the shape of the aquarium tube (1). It also shows the relative positions of the retaining ring (5), aeration/filtration exit (6) and the floatable filtration unit handle (10). The retaining ring (5) forms the window (9) used to transmit light into the aquarium and prevents gravel (7) from obscuring that window. The handle (10) is attached to the retaining ring (5) and enables easy removal from the aquarium, as explained more fully below.

FIG. 3 shows the invention detailing its two detachable sections the floatable filtration unit (4) and the non-floatable filtration and cleaning unit (17). These units work together to provide efficient filtration. Air is pumped in through the air tubing and stone (16) which is attached to the aquarium base and rises through the air pocket (14) (which is filled with water until floatability is desired) to the air pocket top (15). The air bubbles move along the slanted transparent air pocket top (15) and into the aeration/filtration exit (6), thus forcing water out of the aeration/filtration exit (6). Displacement of the water out of exit (6) creates a current which forces the aquarium water to flow through gravel (7), holes (18), sponge (8) and gasket (11) back into the air pocket (14), completing the cycle and cleaning the water in the process. When the aeration/filtration exit (6) is plugged, air becomes trapped in the air pocket (14), displacing water through the sponge (8) and gasket (11), and also through the holes (18) and the gravel (7). The air pocket (14) is designed to enable sufficient water to be displace for floatation. The non-floatable filtration and cleaning unit (17) consists of two rigid plastic plates (12) bolted together with a sponge (8) in between. A heat/light source (13) extends through an opening in the middle of the non-floatable filtration and cleaning unit (17) and is attached to the top plate (12) and floats in the air pocket (14). Light enters the aquarium through the window (9). After the floatable filtration and cleaning unit (4) has been removed, using its handle (10), the non-floatable filtration and cleaning unit (17) can be raised to the top and pushed back to the bottom of the aquarium. In the process the tight fitting sponge (8) cleans the wall of the aquarium. The heat/light source (13) has sufficient wiring to allow the heat/light source to accompany the non-floating filtration and cleaning unit (17) to the top of the aquarium.

The non-floatable cleaning unit (17) may be connected to a floatable unit (4) for movement therewith. Bonding or other techniques known in the art may be utilized for this purpose. Hence, when the exit or opening (6) is plugged and the floatable unit (17) moves with it. The cleaning elment or sponge (8) being in engagement with the inside surface of the container side wall (1) functions to clean the side wall during such movement.

That which is claimed is

1. An aquarium comprising a container having a bottom wall and a side wall extending upwardly, therefrom, a floatable unit inside the container normally at the bottom thereof having an exterior configuration that closely conforms to the interior configuration of the container, a pocket formed on the underside of the floatable unit, means providing a source of air in communication with the pocket, a portion of the floatable unit defining an opening capable of being plugged located near the top of the floatable unit and normally providing an exit for the air but when plugged allowing the air to collect in the pocket whereby the floatable unit rises to the top of the container, and a cleaning unit connected to the floatable unit for movement therewith, the cleaning unit including a cleaning element in contact with the inside surface of the container side wall during movement of the floatable unit within the container.

2. An aquarium as in claim 1 including a source of light located within the pocket of the floatable unit when the unit is at the bottom of the container, and the floatable unit including a transparent portion at the top thereof communicating with the light source for transmitting the liqht upwardly into the container.

3. An aquarium as in claim 1 wherein the floatable unit includes a filtration receptable with filtration medium therein, and at least one passageway through the receptable that enables water to flow through the filtration medium.

4. An aquarium comprising a container having a bottom wall and a side wall extending upwardly therefrom, a floatable unit inside the container normally at the bottom thereof having an exterior configuration that closely conforms to the interior configuration of the container, a pocket formed on the underside of the floatable unit, means providing a source of air in communication with the pocket, a portion of the floatable unit defining an opening capable of being plugged located near the top of the floatable unit and normally providing an exit for the air but when plugged allowing the air to collect in the pocket whereby the floatable unit rises to the top of the container, and the floatable unit including a filtration receptacle with filtration medium therein, and at least one passageway through the receptacle that enables water to flow through the filtration medium.

5. An aquarium as in claim 4 including a source of light located within the pocket of the floatable unit when the unit is at the bottom of the container, and the floatable unit including a transparent portion at the top thereof communicating with the light source for transmitting the light upwardly into the container.

* * * * *